Aug. 25, 1959 G. HERR ET AL 2,901,038
SUN VISOR
Filed March 21, 1956 3 Sheets-Sheet 1

INVENTORS
GERHARD HERR &
BY WILLY O. TREBER
John Joseph Roethel
ATTORNEY

Aug. 25, 1959  G. HERR ET AL  2,901,038
SUN VISOR
Filed March 21, 1956  3 Sheets-Sheet 2
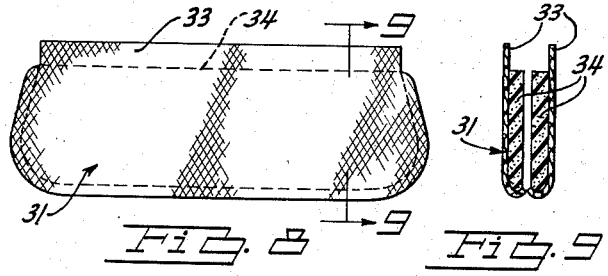
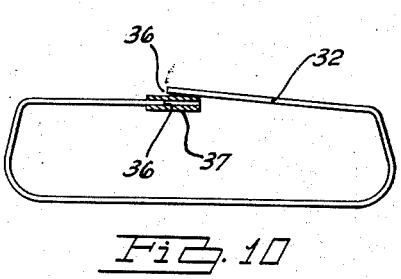
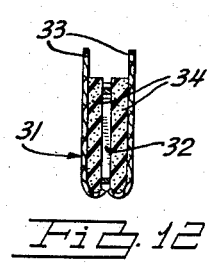
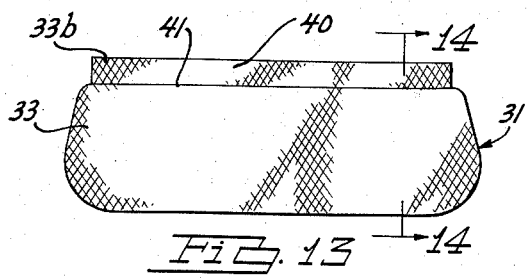
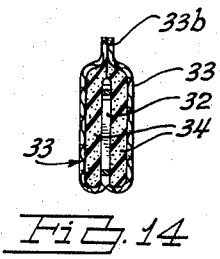
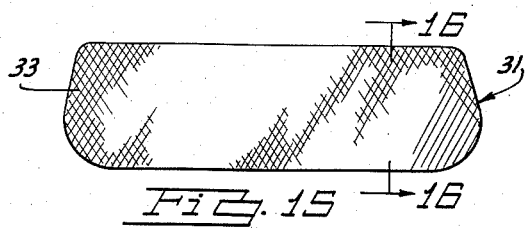
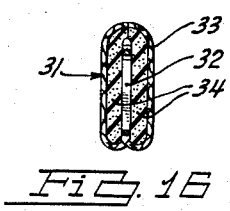
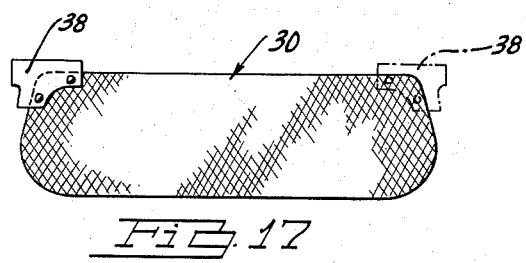
INVENTORS
GERHARD HERR &
BY WILLY O. TREBER
John Joseph Roethel
ATTORNEY Aug. 25, 1959

G. HERR ET AL 2,901,038

SUN VISOR

Filed March 21, 1956

INVENTORS
GERHARD HERR &
BY  WILLY O. TREBER

John Joseph Roethel
ATTORNEY

United States Patent Office 2,901,038
Patented Aug. 25, 1959

2,901,038

SUN VISOR

Gerhard Herr, Wuppertal-Vohwinkel, and Willy O. Treber, Wuppertal-Elberfeld, Germany, assignors to Gebruder-Happich-Gesellschaft mit beschrankter Haftung, Wuppertal-Elberfeld, Germany Application March 21, 1956, Serial No. 572,997

Claims priority, application Germany April 4, 1955

3 Claims. (Cl. 160—354)

The present invention relates to a sun visor especially adapted for use in vehicles, particularly in motor cars, as a protection against intruding blinding sun rays. More particularly the present invention relates to an improved sun visor of elastic design and material and also to a method of manufacturing the same.

Sun visors consisting simply of a disk or plate member made of cardboard or other semi-rigid material, which may be transparent are known. The object of the present invention is to provide a sun visor which is substantially elastic in construction, that is, one which is deformable in any direction with little resistance and which elastically reacts to pressure. The sun visor so provided is capable of acting as a crash pad to prevent injury to the occupants of the vehicle in case of accident. Briefly, the present invention is embodied in a sun visor consisting of a bag made of resilient material containing a resilient frame.

More particularly the present invention is embodied as a soft elastic bag-like sun visor comprising a pair of outer covering sheets adapted to be joined together along abutting edges thereof. Cushioning material is disposed between said sheets and is enclosed thereby, said sheets and cushioning material having meeting edges. The shape of the sun visor is maintained by a resilient wire frame inserted between edge layers of the cushioning material. The wire frame extends completely around the sun visor although spaced inwardly of the periphery thereof.

With these and other objects in view, which will become apparent in the following detailed description, the present invention will be clearly understood in connection with the accompanying drawings, in which:

Figure 1 illustrates in perspective a sun visor embodying the present invention prior to the attachment of any fastening or mounting devices;

Figures 2 to 17, inclusive, present alternate side and cross-sectional views of a sun visor during the various stages of its construction in accordance with the method of one embodiment of the present invention, or, more specifically:

Fig. 8 is a side view illustrating the visor body after the inside has been turned outside;

Fig. 9 is a sectional view taken along the lines 9—9 of Fig. 8;

Fig. 10 is a side elevation of the resilient frame;

Fig. 11 is a side view illustrating the introduction of the spreading or resilient frame into the visor body;

Fig. 12 is a sectional view taken along the lines 12—12 of Fig. 11;

Fig. 13 is a side view illustrating the welding of the upper longitudinal edge of the sun visor;

Fig. 14 is a sectional view taken along the lines 14—14 of Fig. 13;

Fig. 15 is a side view illustrating the completed sun visor;

Fig. 16 is a sectional view taken along the lines 16—16 of Fig. 15; and

Fig. 17 illustrates the completed sun visor with its mounting hardware attached thereto;

Figure 18:
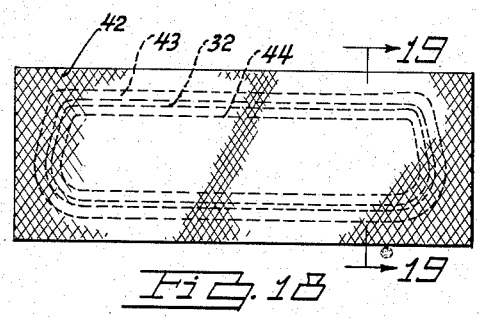
Figure 19:
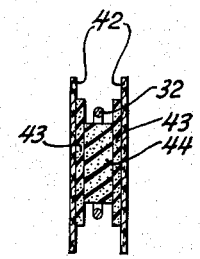
Figure 20:
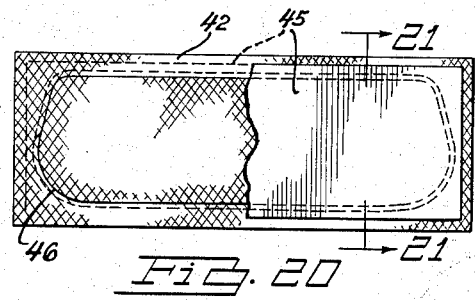
Figure 21:
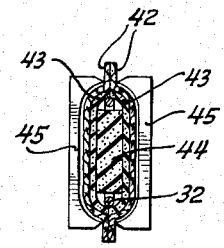
Figure 22:
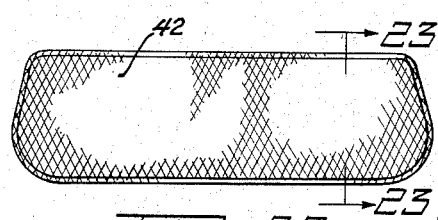
Figure 23:
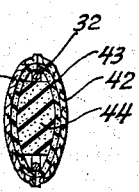

Figures 18 to 23, inclusive, illustrate alternate side and cross-sectional views of a sun visor during the stages of its construction in accordance with the method of a second embodiment of the present invention, or, more specifically:

Fig. 18 is a side view of the previously cut out layers of material;

Fig. 19 is a section taken along the lines 19—19 of Fig. 18;

Fig. 20 is a side view illustrating the appearance after the welding of the material layers;

Fig. 21 is a sectional view taken along the lines 21—21 of Fig. 20;

Fig. 22 represents the finished sun visor after the excess material has been trimmed therefrom; and Fig. 23 is a sectional view taken along the lines 23—23 of Fig. 22.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
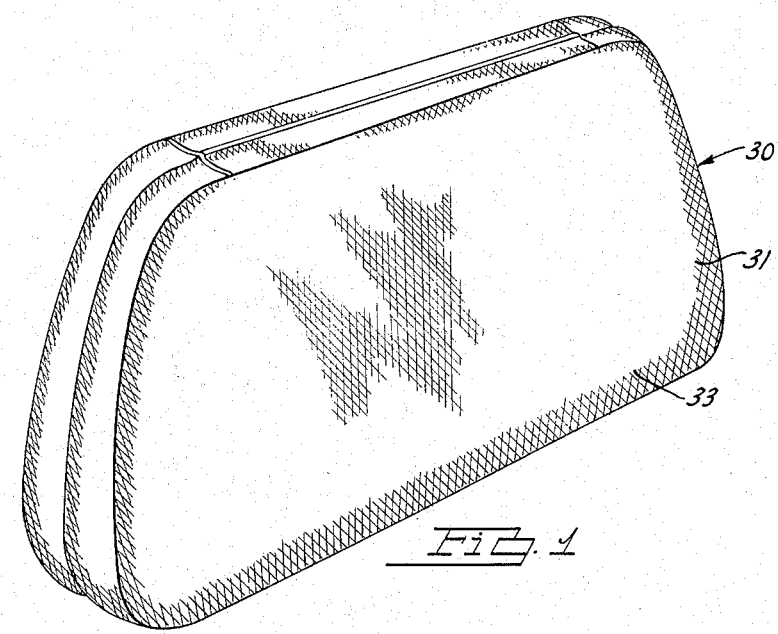

Referring now to the drawings, and in particular first to Fig. 1, there is illustrated a sun visor, generally designated 30, comprising a bag or body unit 31. The bag or body unit 31 is held in shape by a resilient frame member 32 (Fig. 10). It will be understood that the bag or body unit 31 will be of such length and width as to suitably screen the sun's rays as well as to provide a maximum cushioning area.

Figure 2:
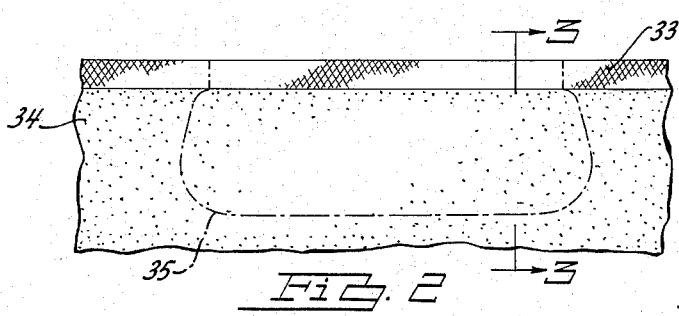
Fig. 2 is a side view which illustrates the layers of material placed one on top of the other before the edges are formed.

The outer walls of the bag or body unit 31 are made of long wearing fabric or plastic material 33 having soft and resilient characteristics. A cushioning layer 34 may be provided. As shown in Fig. 2, the circumferential form of the sun visor is marked by a seam 35 running through the material layers 33 and 34 and connecting the outer walls to each other.

As was stated above, the bag or body unit 31 is held in normal operative shape by a resilient frame member 32. The frame member 32 consists of resilient material, e.g., thin steel or plastic wire bent in the inner form of the bag. The butt ends 36 of the frame member 32 may be joined by welding or by a sleeve 37. The resilient frame member 32 is introduced into the bag in such a way as to maintain the body or bag unit in its desired form but with a high degree of resiliency.

As shown in Fig. 17 suitable mounting hardware 38 is provided for pivotally mounting the sun visor 30 on the conventional swinging arm bracket (not shown). The mounting hardware 38 may be secured to the body or bag unit 31 in any convenient manner, preferably riveted or otherwise secured to the frame member 32.

In the construction of the sun visor a great variety of covering and cushioning materials may be used. Particularly advantageous is the processing of the covering material and the cushioning material out of widths of material which will result in more or less purely mechanical or standardized manufacture. The method or procedure illustrated in Figs. 2 to 17, inclusive, is a preferred method of making full use of the advantages offered by mechanical manufacture of the sun visor.

Figure 3:
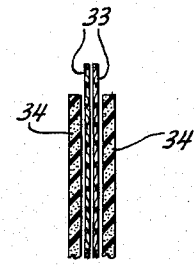
Fig. 3 is a sectional view taken along the lines 3—3 of Fig. 2.
Figure 4:
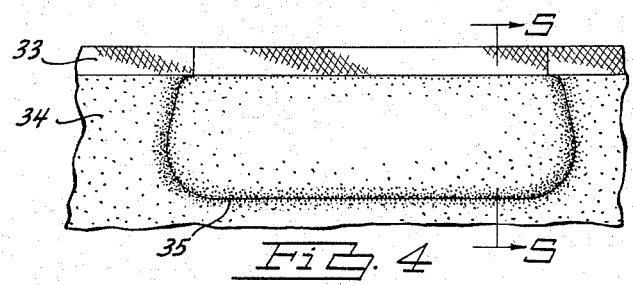
Fig. 4 is a side view which illustrates the connection of the layers after the application of the welding electrodes.
Figure 5:
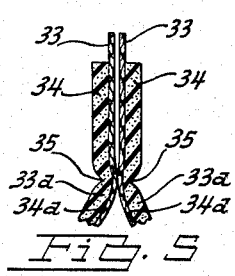
Fig. 5 is a sectional view taken along the lines 5—5 of Fig. 4.
Figure 6:
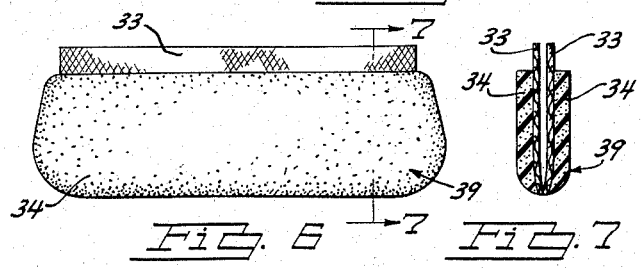
Fig. 6 is a side view which illustrates the visor body cut out around the welded edges.
Figure 7:
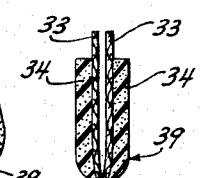
Fig. 7 is a sectional view taken along the lines 7—7 of Fig. 6.

In carrying out the method illustrated in Figs. 2 to 17 inclusive, the material is handled as follows: First, two layers of fabric 33 are sandwiched between layers of cushioning material 34, as best shown in Fig. 3. Next, three sides of the cushioning layers 34 and the fabric layers 33 are joined by a seam 35. The seam 35 preferably joins one longitudinal or long edge and the two short edges, the seam following the desired contour of the bag or body unit 31. The excess material, designated 33a and 34a is trimmed or cut off resulting in the bag-like structure 39 shown in Figs. 6 and 7. The bag-like structure 39 is then turned inside out resulting in the bag or body unit 31 of the sun visor 30 embodying the present invention.

The frame member 32 is then introduced into the bag unit 31, as shown in Fig. 11. Finally, the flap portions 40 extending along the top longitudinal edge of the bag or body unit are joined by a seam at 41 and the excess material 33b is trimmed off.

It will be understood that if the outer covering 33 is a plastic material it may be possible to use welded seams instead of the conventional stitched seams. The use of welded seams would permit the simultaneous trimming of the excess material 33a, 33b and 34a. For this reason, it would be particularly advantageous to use a plastic foil material as the outer or covering layer 33 and a foam rubber plastic as the cushioning layer 34.

As illustrated in Fig. 17, the mounting bracket 38 is placed at either end of the bag or body unit 31 upon completion thereof.

Figs. 18 to 23, inclusive, illustrate an alternative method of procedure for manufacturing the sun visor particularly adapted for use with all plastic material and wherein the seams are welded together. Referring to Figs. 18 and 19, the sun visor body unit is constructed of two outside layers of plastic foil 42 having sandwiched therebetween two layers of foam plastic 43 and a single layer of foam plastic 44 somewhat thicker than the layers 43. Also included is the frame member 32. Thus, as shown in Fig. 19, the structure comprises an outer layer 42, a foam layer 43, a second foam layer 44 having the frame member 32 positioned therearound, a next layer of foam plastic 43 and the second layer of plastic foil 42. This package or sandwich is pressed together by means of appropriately shaped dies 45, diagrammatically illustrated in Fig. 21. The seam represented by the line 46 in Fig. 20 is then welded together. A suitable trimming and sealing operation on the material projecting beyond the die edges provides the desirable ovaliform shape illustrated in Fig. 23.

While we have disclosed several embodiments of the present invention, it is to be understood that these embodiments are given by example only and not in a limiting sense, the scope of the present invention being determined by the objects and the claims.

We claim:

1. A soft, elastic, flat sun visor for a motor vehicle, comprising a pair of outer covering sheets joined together along abutting edges thereof, a resilient wire of a configuration complementary to the outer contour of said covering sheets disposed in said sun visor in an imaginary plane dividing said sun visor in two longitudinally disposed, substantially equal sections, a sheet of cushioning material disposed in and at least partly filling said covering sheets on each side of said imaginary plane, and the edge portions of each of said cushioning sheets meeting the corresponding edge portions of the other of said cushioning sheets, at least the edge portions of said oppositely disposed cushioning sheets defining a substantially rectangular, ring-like chamber receiving said resilient wire, thereby providing free movement of said resilient wire between said cushioning sheets and maintaining said covering sheets and said cushioning sheets in substantially flat position, simultaneously compressing said cushioning material by said cover sheets, yet permitting contraction of said resilient wire upon subjecting said covering sheets to an outside blow.

2. A soft, elastic, flat sun visor for a motor vehicle, comprising a pair of outer covering sheets joined together along abutting edges thereof, a resilient wire of a configuration complementary to the outer contour of said covering sheets disposed in said sun visor in an imaginary plane dividing said sun visor in two longitudinally disposed, substantially equal sections, a sheet of cushioning material disposed in and at least partly filling said covering sheets on each side of said imaginary plane, and the edge portions of each of said cushioning sheets meeting the corresponding edge portions of the other of said cushioning sheets, said oppositely disposed covering sheets defining a chamber receiving said resilient wire, thereby providing free movement of said resilient wire between said cushioning sheets and maintaining said covering sheets and said cushioning sheets in substantially flat position, simultaneously compressing said cushioning material by said cover sheets, yet permitting contraction of said resilient wire upon subjecting said covering sheets to an outside blow.

3. A soft, elastic, flat sun visor for a motor vehicle, comprising a pair of outer covering sheets joined together along abutting edges thereof, a resilient wire of a configuration complementary to the outer contour of said covering sheets disposed in said sun visor in two longitudinally disposed, substantially equal sections, a first sheet of cushioning material disposed in and at least partly filling said covering sheets on each side of said imaginary plane, and the edge portions of each of said cushioning sheets meeting the corresponding edge portions of the other of said cushioning sheets, a second sheet of cushioning material disposed between said oppositely disposed first sheets of cushioning material, and said second cushioning sheet being short of the edge portions of said first cushioning sheets, said edge portions of said first cushioning sheets defining jointly with the edge portions of said second cushioning sheet a substantially rectangular, ring-like chamber receiving said resilient wire, thereby providing free movement of said resilient wire between said cushioning sheets and maintaining said covering sheets and said cushioning sheets in substantially flat position, simultaneously compressing said cushioning material by said cover sheets, yet permitting contraction of said resilient wire upon subjecting said covering sheets to an outside blow.

References Cited in the file of this patent

UNITED STATES PATENTS

| | | |
|---|---|---|
| 1,989,929 | Jacobs | Feb. 5, 1935 |
| 2,232,640 | Schwartzman | Feb. 18, 1941 |
| 2,234,284 | Schoenheit | Mar. 11, 1941 |
| 2,506,689 | Simpson et al. | May 9, 1950 |
| 2,559,841 | Aspenwall | July 10, 1951 |
| 2,560,009 | Straith | July 10, 1951 |
| 2,575,764 | Morner | Nov. 20, 1951 |
| 2,589,866 | Roberts | Mar. 18, 1952 |
| 2,592,573 | Joncas | Apr. 15, 1952 |
| 2,677,634 | Collier | Mar. 4, 1954 |

FOREIGN PATENTS

| | | |
|---|---|---|
| 357,622 | Germany | Aug. 29, 1922 |
| 1,109,788 | France | Sept. 28, 1955 |